United States Patent
Chen et al.

(10) Patent No.: US 7,852,756 B2
(45) Date of Patent: Dec. 14, 2010

(54) NETWORK INTERFACE SYSTEM WITH FILTERING FUNCTION

(75) Inventors: Jyshyang Chen, Cupertino, CA (US); Chao Jiang, Beijing (CN)

(73) Assignee: 02Micro International Limited, Grand Caymna (KY)

( * ) Notice: Subject to any disclaimer, the term of this patent is extended or adjusted under 35 U.S.C. 154(b) by 407 days.

(21) Appl. No.: 11/818,307

(22) Filed: Jun. 13, 2007

(65) Prior Publication Data

US 2008/0310440 A1   Dec. 18, 2008

(51) Int. Cl.
  *H04L 12/22* (2006.01)
  *H04L 12/26* (2006.01)
(52) U.S. Cl. .................. 370/229; 370/235; 370/412
(58) Field of Classification Search ............ None
  See application file for complete search history.

(56) References Cited

U.S. PATENT DOCUMENTS

| | | | |
|---|---|---|---|
| 2004/0193892 A1* | 9/2004 | Tamura et al. | 713/182 |
| 2004/0205359 A1* | 10/2004 | Matsuhira | 713/201 |
| 2006/0067231 A1* | 3/2006 | Ikoma et al. | 370/235 |
| 2007/0201474 A1* | 8/2007 | Isobe | 370/392 |
| 2008/0040304 A1* | 2/2008 | Pujolle et al. | 706/46 |
| 2008/0212581 A1* | 9/2008 | Miller et al. | 370/389 |
| 2009/0254991 A1* | 10/2009 | Boulanger et al. | 726/23 |

* cited by examiner

*Primary Examiner*—Chi H Pham
*Assistant Examiner*—Soon-Dong D Hyun

(57) ABSTRACT

A network interface system with packet filtering function is disclosed herein. The network interface system includes interfaces, a packet buffer and a controller. The packet buffer stores data packets received by the network interface system. The controller provides security defense for the host system and the network by filtering the data packets stored in the packet buffer. The controller controls the packet buffer abandoning a data packet if the data packet is identified as an unsafe packet. The controller also includes a regulator for controlling a transferring order of the data packets. Thus, the network interface system can drop unsafe data packet and transfer data packets considered as safe information. The data packets can be processed in a sequence according to preset priority rules.

22 Claims, 6 Drawing Sheets

| FIELD | SIGNATURE | MASK |
|---|---|---|
| NETWORK PROTOCOL | | |
| VLAN PRIORITY | | |
| VLAN ID | | |
| IP TOS | | |
| SOURCE IP | | |
| DESTINATION IP | | |
| TRANSPORT PROTOCOL | | |
| SOURCE PORT | | |
| DESTINATION PORT | | |

FIG. 5

| FIELD | SIGNATURE | MASK |
|---|---|---|
| NETWORK PROTOCOL | 0X0800 | 0XFFFF |
| VLAN PRIORITY | 0 | 0 |
| VLAN ID | 0 | 0 |
| IP TOS | 0 | 0 |
| SOURCE IP | 01020300 | 0XFFFFFF00 |
| DESTINATION IP | 0 | 0 |
| TRANSPORT PROTOCOL | 0 | 0 |
| SOURCE PORT | 0 | 0 |
| DESTINATION PORT | 0 | 0 |

FIG. 5A

NETWORK INTERFACE SYSTEM WITH FILTERING FUNCTION

FIELD OF THE INVENTION

This invention relates to data transmission systems and more particularly to network interface systems for transferring information in the data transmission systems.

BACKGROUND OF THE INVENTION

In early days, computer systems worked independently and rarely communicated with each other. Today, however, it is well known that interconnecting computer systems with networks, such as local area networks (LAN) or wide area networks (WAN), greatly enhances the sharing of information, services and other resources available via the network. A network interface card (NIC) is usually employed for exchanging data between the host system and the network. A conventional NIC commonly includes interfaces to connect the host system and the network via the NIC. The conventional NIC may have a packet buffer to store data packets received by the NIC and a controller to control the packet buffer forwarding the data packets at an appropriate time.

As a result of interconnection of data networks, security has become a major concern for the connected host systems and networks. Unauthorized access to a company's data network can result in a loss of valuable proprietary information of the company. Furthermore, unauthorized access can also result in attacks to data network and computing system of the company, causing a loss of data or a crash. Hence, in an interconnected world, it is crucial for network users to protect their information and computer system. Various methods and devices have been used to enhance network security, including firewalls, identification and authentication (I&A), intrusion detectors, cryptography (particularly public key cryptography) and virtual private networks (VPN).

Network security has concentrated on the use of firewalls. Typically, firewalls are located at strategic points in the network such that all incoming and outgoing data traffic must pass through a firewall. Firewalls have been used to protect an organization's internal resources from the external Internet by passing certain protocols (e.g. email, name services) into the protection perimeter, but filtering out all protocols not explicitly listed. The firewalls attempt to isolate a specific intranet from the remainder of the Internet. Firewalls provide proxy servers that stand between the external network and internal resources and the proxy servers pre-validate external requests.

The implementation of host system using security software such as firewalls to operate security defense against unauthorized data packets has provided certain protection for the host systems and the networks. However, the security software consumes much resource of the computer system. Moreover, if some unsafe information such as an attack packet reaches the host system, the host system may be affected before the firewall cleans up the attack packet.

SUMMARY OF THE INVENTION

In one embodiment, a network interface system for transferring a data packet between a host system and a network is disclosed. The network interface system includes a buffer and a controller. The buffer can store the data packet while the controller monitors the data packet and generates a control signal to control a disposition of the data packet. The data packet is passed if the control signal is a pass signal and the data packet is dropped if the control signal is a drop signal.

In another embodiment, a method for transferring a data packet between a host system and a network via a network interface system is disclosed. The method comprises the steps of receiving the data packet, monitoring the data packet, matching the data packet with a plurality of rules from the host system, generating a control signal base upon a matching result, dropping the data packet if the control signal is a drop signal and passing the data packet if the control signal is a pass signal.

In yet another embodiment, there is disclosed a computer system communicating with a network. The computer comprises an input device, a microcontroller and a network interface system. The input device takes inputs from users and the micro controller performs operations based on the inputs from the users. The network interface system transfers a data packet between the computer and the network. The network interface system includes a buffer and a controller. The buffer can store the data packet. The controller monitors the data packet and generates a control signal to control a disposition of the data packet. The data packet is passed if the control signal is a pass signal and the data packet is dropped if the control signal is a drop signal.

BRIEF DESCRIPTION OF THE DRAWINGS

Advantages of the present invention is apparent from the following detailed description of exemplary embodiments thereof, which description should be considered in conjunction with the accompanying drawings, in which:

FIG. 5 is a simplified schematic diagram of an exemplary rule incorporated with the regulator of FIG. 4 according to one embodiment of the present invention.

FIG. 5A is a simplified exemplary schematic diagram of the rule in FIG. 5 according to one embodiment of the present invention.

DETAILED DESCRIPTION OF THE INVENTION

Figure 1:
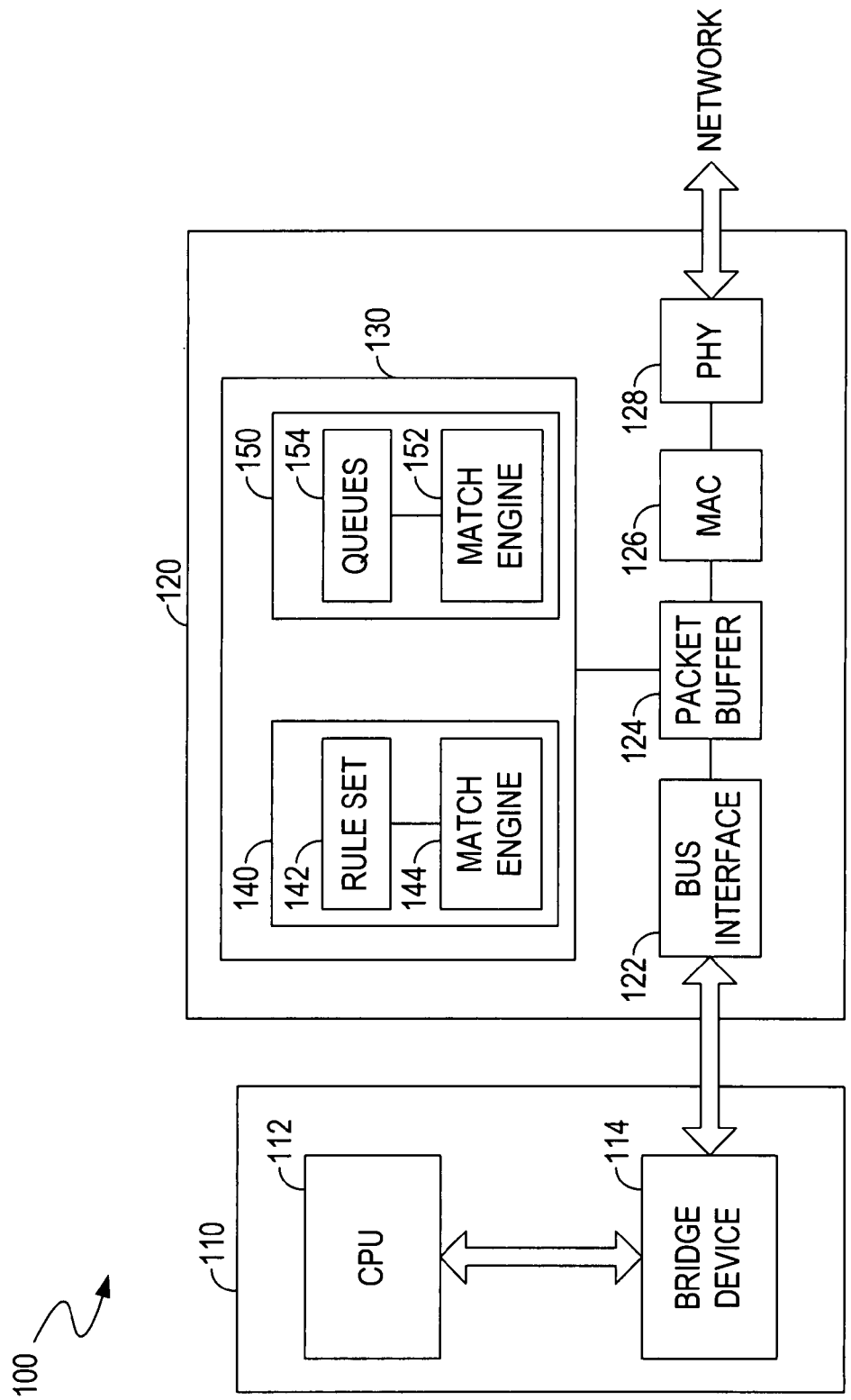
FIG. 1 is a block diagram of a preferred exemplary data communication system with a network interface system according to one embodiment of the present invention.

The present invention provides a network interface system for exchanging data in a data communication system. The data communication system includes a host system, a network and the network interface system coupled between the host system and the network. Since the embodiments shown in the drawings are only for illustrative purposes, some subcomponents and/or peripheral components generally incorporated in the data communication system are omitted herein for clarity. In describing the preferred embodiments, specific terminologies are employed for the sake of clarity. However, the disclosure of this patent specification is not intended to be limited to the selected terminology and the specified embodiments. It is understood that each specific element includes all technical equivalents that operate in a similar manner.

FIG. 1 depicts a data communication system 100 according to one embodiment of the invention. The data communication system 100 includes a host system 110 and a network interface system 120. The host system 110 communicates with a network via the network interface system 120. The host system 110 includes a microprocessor such as a center process unit (CPU) 112 and a bridge device 114. The host system 110 also includes other apparatus such as input devices, output devices such as display devices, printers, etc. The CPU 112 is employed to perform operations based on inputs from users and operate other instructions. Peripheral components of the host system 110 are omitted herein for purposes of clarity and brevity. It is appreciated to those skilled in the art that the host system 110 is a holonomic system such as a computer that can complete certain operations. The bridge device 114 connects the host system 110 to the network interface system 120. The host system 110 generates security rules based on one or more security policies to control the communication between the host system 110 and the network. The security rules are located in the network interface system 120.

The network interface system 120 includes a bus interface 122, a packet buffer 124, a media access control (MAC) layer 126 and a network interface such as a physical layer (PHY) 128. The network interface system 120 is coupled to the host system 110 and the network respectively via the bus interface 122 and the physical layer (PHY) 128. The packet buffer 124 stores data packets received by the network interface system 120. The MAC layer 126 can modulate the data packets. The network interface system 120 may be connected to the network via hardware, such as a fiber optic cable, a coaxial cable, a twisted pair cable or a telephone line, or connected via wireless apparatus such as a radio frequency (RF) module integrated in the physical layer (PHY) 128.

The network interface system 120 has a controller 130 to control traffic of data packets passing through the network interface system 120. The controller 130 sets a security defense for the host system 110 as well as the network by applying security check to the data packets received by the network interface system 120. If a data packet is considered as unsafe information according to preset security rules from the host system 110, the controller 130 thus drives the packet buffer 124 to drop the data packet. The controller 130 provides a filter 140 for implementing the security check to the data packets. The filter 140 can determine a disposition of a data packet received by the network interface system 120 according to the security rules. Thus the network interface system 120 controls dispositions of the data packets to protect the host system 110 and the network according to security requirement. With the security defense at the network interface system 120, the host system 110 and the network can be protected effectively from viruses, intrusions, attacks, etc.

The filter 140 includes a rule set 142 and a match engine 144. The host system 110 generates the security rules according to the security policies and stores the security rules in the rule set 142. The security rules define which data packets are allowed to pass and which data packets can be blocked. Each of the security rules defines one or more parameters of a data packet (e.g. a source port and a destination port) and also a disposition of the data packet if the rule is matched by the data packet. The security rules are stored in a sequential order in the rule set 142 according to priorities of the security rules. The data packets stored in the packet buffer 124 can be tested against the security rules in the sequential order. Moreover, the filter 140 can include a plurality of match engines that can apply the security rules to the data packet simultaneously. Each of the match engines practices one rule matching the data packet. An arbiter can analyze matching results of the match engines to select one proper rule as a matched rule for the data packet. Hence the process of security check in the network interface system 120 can be rapid.

The match engine 144 of the filter 140 can provide a matching operation for the data packet with the security rules. The match engine 144 may be a content match engine. The content match engine 144 applies the security rules to the data packet in the sequential order according to the priorities of the security rules. If one current rule is not matched, a next current rule in the sequential order can be applied to the data packet until one of the security rules is matched. Then the matching process for the data packet is completed. An action indicated by a matched rule, such as drop or pass can be carried out with respect to the data packet under control of the controller 130. Thus the data packet can be dropped by the packet buffer 124 if a drop decision is reached or reserved in the packet buffer 124 if a pass decision is reached. If the data packet is not matched by any of the security rules, further instruction from the host system 110 may be applied to the data packet, such as examining the data packet using security software, etc.

The match engine 144 can also be a header match engine. The header match engine can apply the security rules to a header portion of the data packet simultaneously. Since the security rules have different priorities, a rule with a highest priority among matched rules can be selected as an operating rule by the header match engine. The header match engine thus treats the data packet according to the operating rule to obtain a disposition of the data packet. As compared to the content match engine, the header match engine saves filtering time of data packets since the header match engine applies the security rules to the data packet simultaneously. Thus the transferring speed of the network interface system can be improved, especially when many security rules are employed.

The controller 130 can further include a regulator 150 to improve a quality of service (QoS) of the data communication between the host system 110 and the network. When the packet buffer 124 receives a data packet, the regulator 150 can allocate a transferring priority to the data packet according to preset priority rules. Then the packet buffer 124 can forward the data packets sequentially according to the priorities of the data packets. The regulator 150 includes a match engine 152 and queues 154. The match engine 152 allocates transferring priorities to the data packets according to the preset priority rules. The queues 154 are many queues with different priorities. After transferring priority allocation, certain properties of the data packet can be stored in a queue of the queues 154. The queue of the queues 154 has a priority that can identify the transferring priority of the data packet. Thus each data packet in the packet buffer 124 is arranged in one of the queues 154 after transferring priority allocation by the match engine 152. When the packet buffer 124 releases the data packets, a first data packet in a highest priority queue of the queues 154 can be handled first. Data packets in a lower priority queue can be handled after a higher priority queue is finished.

Figure 2:
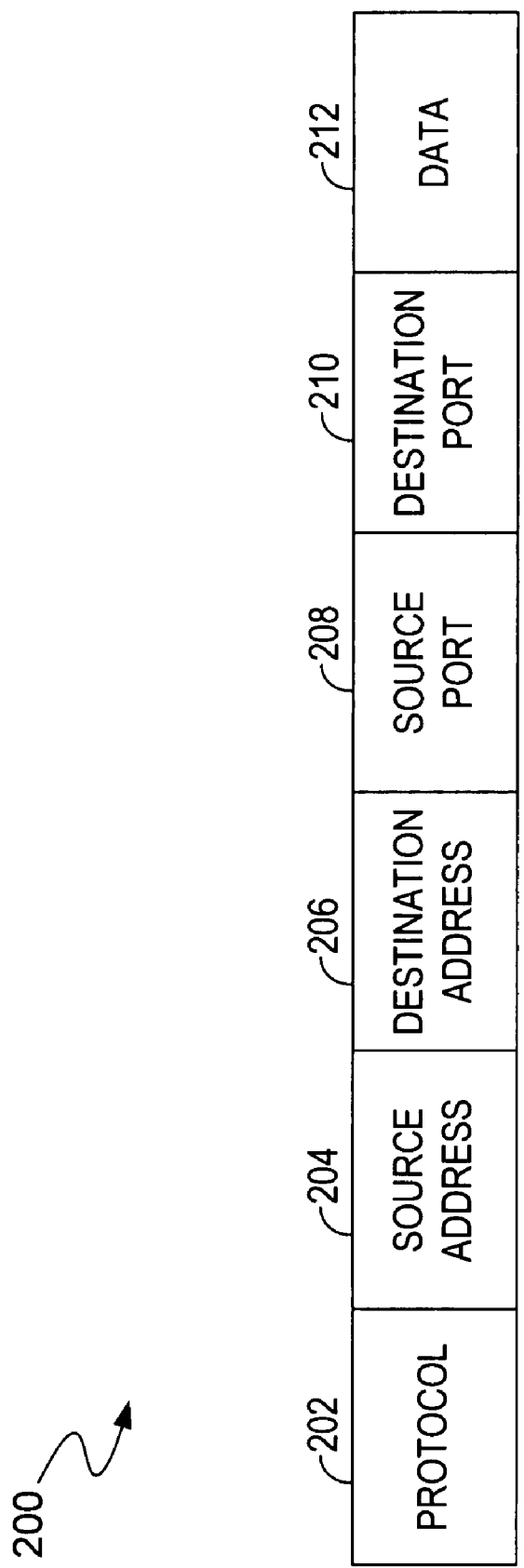
FIG. 2 is a simplified block diagram of an exemplary data packet according to one embodiment of the present invention.

FIG. 2 shows an exemplary data packet 200 according to one embodiment of the present invention. The data packet 200 includes a protocol field 202, a source address field 204, a destination address field 206, a source port 208, a destination port 210 and a data field 212. The protocol field 202 can indicate a network protocol of the data packet. The source address field 204 can identify a source IP address, while the destination address field 206 can identify a destination IP address. The source port 208 contains a source port number, while the destination port 210 contains a destination port number. The data field 212 can contain payload of the data packet. The data packet 200 is transferred in the network and arrives at a host system via a network interface system. The host system can receive and process the data packet 200.

Figure 3:
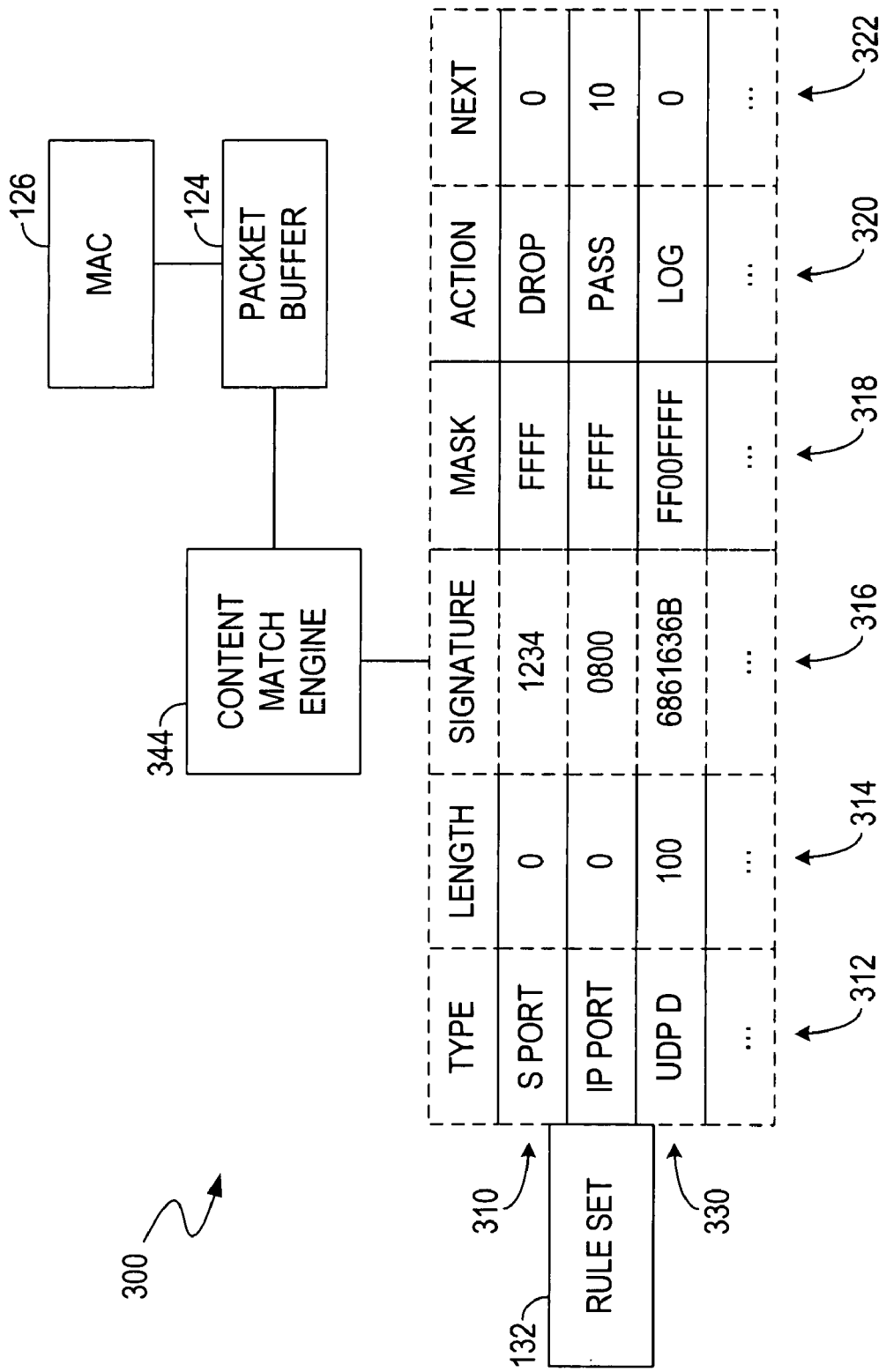
FIG. 3 is a simplified schematic diagram of an exemplary filter of the network interface system of FIG. 1 according to one embodiment of the present invention.

FIG. 3 shows some of the components of the network interface system 120 and exemplary security rules according to one embodiment of the present invention. Referring to FIG. 3, the rule set 132 stores the security rules in a sequential order. Each of the security rules includes fields for type 312, signature 316, mask 318 and action 320. The type 312 indicates a parameter field of the data packet, such as a source port. The signature 316 provides reference content for the parameter field of the data packet. The mask 318 indicates four valid bits of the signature 316 using an F in a hex form. The action 320 gives a disposition of the data packet if the rule is matched. In case a rule is matched by a data packet, the controller 130 informs the packet buffer 124 to drop the data packet if the action 320 specified by the rule is a drop disposition or to reserve the data packet in the packet buffer 124 if the action specified by the rule is a pass disposition.

When a rule is applied to a data packet, according to the type 312 of the rule, a corresponding portion of the data packet is obtained by the filter 132 as key content. According to the mask 318, valid bits of the key content and the signature 316 are compared with each other. If the valid bits of the key content and the signature 316 are equal, the rule is matched by the data packet. For example, if a rule 310 is applied to the data packet, according to the type 312, a source port of the data packet can be compared to the signature 316 of the rule 310. Since the mask 318 is set to FFFF, the last sixteen bits of the signature 316 are indicated to be valid. If the last twelve bits of the source port have the same value as the last twelve bits of the signature 316, the rule 310 is matched by the data packet. Thus the data packet can be dropped according to a drop disposition indicated by an action 320 of the rule 310.

The security rules may further include a length 314 to indicate a length if the type field corresponds to the payload of the data packet. A rule 330 has a length 314 as 100, a signature 316 as 6861636B and a mask 318 as FF00FFFF. When the rule 330 is applied to a data packet, the match engine 344 can search a string of 68XX636B in first 100-bit payload of the data packet. In the string 68XX636B, the character X means that any four-bit content is available. If the string 68XX636B is found in the first 100 bits of the payload, the rule 330 is matched by the data packet. Thus the action log can be applied to the data packet. The security rules may also include a next field 322 to direct a next rule that can be applied to a data packet if a current rule is matched. The signature 316 of a rule can be a predetermined range. For example, a rule can have a signature as 50~5000, if key content of a data packet is in the range of 50~5000, the rule is matched by the data packet.

Referring to FIG. 1, with the filter 140, the network interface system 120 can drop data packets considered to include unsafe information and allow data packets considered to include safe information according to the security rules. Thus unauthorized access to the host system 110 can be blocked by the network interface system 120. Since the network interface system 120 also applies the security rules to data packets from the host system 110 to the network, the network is protected in a similar way as the host system 110 is protected. Thus the host system 110 and the network are protected from unauthorized data packets according to the security rules.

In the process of transferring data packets, the network interface system 120 receives data packets and stores the data packets in the packet buffer 124. The network interface system 120 can forward the data packets when a destination such as the network or the host system 110 is ready to receive information. Referring again to FIG. 1, the regulator 150 is provided for regulating a transferring order of the data packets to promote efficient utilization of resources. The regulator 150 can manage the network interface system 120 to transfer emergency data packets first and process less important data packets later. Thus the resources of the host system 110 and the network can be allocated more reasonably and efficiently to improve the quality of service (QoS).

The regulator 150 includes the match engine 152, in one embodiment a header match engine, and the queues 154. The match engine 152 judges priorities of the data packets according to predetermined priority rules and allocates transferring priorities to the data packets. Then information associated with the data packets can be stored in corresponding queues of the queues 154 according to the transferring priorities. In this way data packets stored in the packet buffer 124 have separate transferring priorities. Thus the data packets can be processed in a sequence according to the transferring priorities regardless of ingress times into the packet buffer 124.

Figure 4:
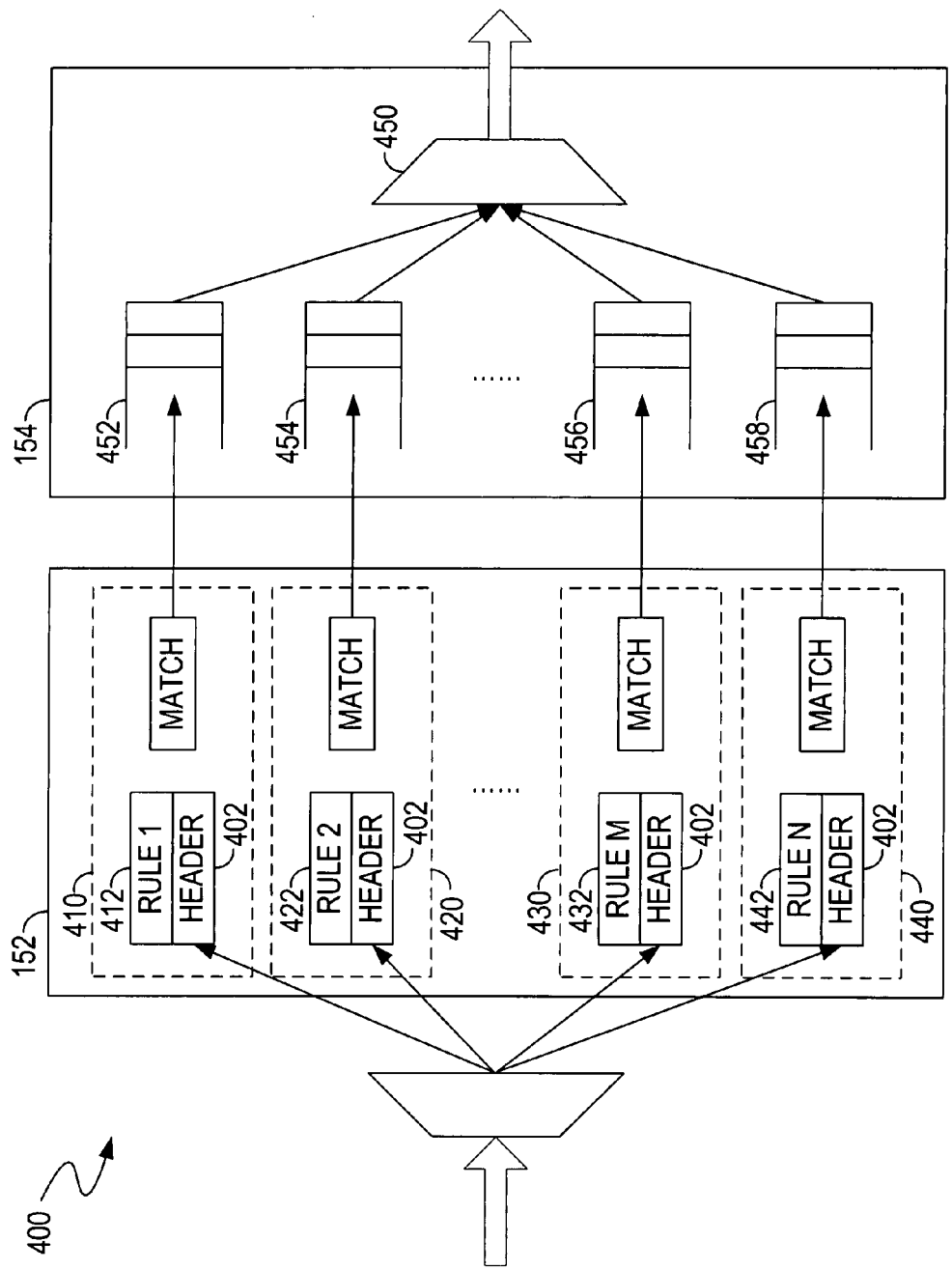
FIG. 4 is a block diagram of a regulator incorporated with the network interface system of FIG. 1 according to one embodiment of the present invention.

FIG. 4 depicts a regulator 400 (QoS system) with a match engine 152 and queues 154 according to one embodiment of the present invention. In one embodiment, the match engine 152 can be a header match engine. The header match engine 152 can include one or more parallel matchers 410, 420, 430 and 440 for processing a packet header simultaneously. The matcher 410 includes a rule buffer 412 for storing a first rule. And, the matchers 420, 430 and 440 have rule buffers 422, 432 and 442 to store different rules separately. The matchers 410, 420, 430 and 440 can have different priorities, for example, the matcher 410 may have a highest priority and the matcher 440 may have a lowest priority. Between the highest and the lowest priorities, the matcher 420 may have a priority higher than the matcher 430. The matchers 410, 420, 430 and 440 have header buffers 402 to store a packet header of a data packet.

When a data packet is stored in the packet buffer (e.g., 124 in FIG. 1), a packet header of the data packet is copied and sent to header buffers 402 of the matchers 410, 420, 430 and 440. Then the matchers 410, 420, 430 and 440 apply the rules stored in the rule buffers 412, 422, 432 and 442 to the packet header in the header buffers 402 separately. Since the matchers 410, 420, 430 and 440 have different priorities, among matchers in which the rule is matched with the packet header, one matcher with highest priority can store information associated with the data packet in a corresponding queue of the queues 154. Matching results of other matchers will be abandoned. For example, if the rule in the matcher 410 is matched by the packet header, information associated with the data packet can be stored in a queue 452 if the queue 452 has a priority associated with the matcher 410. In this example, matching results in the matchers 420, 430 and 440 will be abandoned. If the rule in the matcher 410 is not matched by the packet header, the matcher 420 will be the matcher with highest priority for the data packet if the rule in the matcher 420 is matched by the packet header. If the packet header of the data packet is matched by none of the rules, the data packet maybe stored in a queue with lowest priority.

As provided in the foregoing discussion, in exemplary embodiments, the data packets stored in the packet buffer (e.g., 124 in FIG. 1) have transferring priorities. Moreover, queues (e.g., 154 in FIG. 1) include information indicative of a transferring priority for each of the data packets. Hence, the data packets can be transferred in a sequence according to the queues (e.g., 154 in FIG. 1).

Referring to FIG. 4 again, the regulator 400 has an arbiter 450 to decide which queue to be processed first and which later. The queues 154 store information to indicate transferring priorities of the data packets in the packet buffer (e.g., 124 in FIG. 1). The queues 452, 454, 456 and 458 have a series of priorities from the highest to the lowest. Information of a data packet with a higher priority can be stored in a queue with a higher priority. A data packet with a higher transferring priority can be processed by the packet buffer (e.g., 124 in FIG. 1) earlier than other data packets. When the data packets stored in the packet buffer (e.g., 124 in FIG. 1) are ready to be moved out, the arbiter 450 judges the priorities of the queues and sends the information in the queues to the controller (e.g., 130 in FIG. 1) sequentially. Subsequently, the data packets can be processed according to the transferring priorities indicated by the queues 154. In one embodiment, the controller (e.g., 130 in FIG. 1) obtains information in the queue 452 and identifies a corresponding data packet in the packet buffer (e.g., 124 in FIG. 1). This data packet can be moved out from the packet buffer (e.g., 124 in FIG. 1). Information of a next data packet in the queue 432 can be processed serially. The queue 454 can be handled in a similar way if the queue 452 is finished.

The queues 154 can work in three modes, a strict priority (SP) mode, a weighted round robin (WRR) mode and a limitation bandwidth (LB) mode. In one embodiment, the arbiter 450 first manages a queue with a highest priority among queues in the strict priority (SP) mode. After the queues in the SP mode are finished, queues in the weighted round robin (WRR) mode can be processed. If queues in the WRR mode are also finished, queues in the limitation bandwidth (LB) mode can be processed. Resources and bandwidth spent in each mode can be allocated and adjusted by a host system (e.g., 110 in FIG. 1) according to system requirement. Also, a host system (e.g., 110 in FIG. 1) can set different judging programs for the arbiter 450 to select a preferred way of transferring the data packets in alternative embodiments.

FIG. 5 shows an exemplary rule 500 employed by a regulator (e.g., 150 in FIG. 1) according to one embodiment of the present invention. The rule 500 can decide a transferring priority for a data packet. The rule 500 includes a field 512, a signature 514 and a mask 516. The field 512 may include items indicative of one or more parameters of a packet header, such as a network protocol, a VLAN priority, a VLAN id, an IP TOS, a source IP, a destination IP, a transport layer protocol, a source port, a destination port and so on. The signature 514 provides reference content for indicated parameters and the mask 516 figures out valid bits of the signature 514. A rule can examine one or more items in the field 512. If a packet header of a data packet matches the rule, information associated with the data packet can be stored in a correlated queue of a set of queues (e.g., 154 in FIG. 1).

FIG. 5A depicts an exemplary rule 500A of a matcher in a regulator (e.g., 150 in FIG. 1). The rule 500A includes the field 512, the signature 514 and the mask 516. For a data packet that has the rule 500A applied to, the signature 514 of the network protocol is 0X0800. The characters 0X indicate a hex signature form. According to the mask 0XFFFF, all bits of the signature 514 for the network protocol are valid. The item of the network protocol can be checked with 0800. Also, as the valid bits of source IP is FFFFFF00, the source IP of the data packet can be checked with 010203XX. Other fields of the packet header may not be examined since other items of the field 512 are set to 0. If the packet header fits the items of the rule 500A, it means that the rule 500A is matched by the data packet. Thus if the rule 500A has a highest priority among matched rules, the data packet can be allocated a transferring priority according to a priority of the matcher and the information associated with the data packet can be stored in a corresponding queue. In one embodiment, the data packet can be transferred according to the transferring priority.

Referring again to FIG. 1, the host system 110 can be a computer system. The computer system has input devices such as keyboards and scanners to take inputs from users, output devices such as display devices and printers. The computer system includes a microprocessor to process programs, instructions, and operations based on the inputs from the users and so on. The computer system includes a bridge device to connect to a network via a network interface system. The network interface system can be separate from the computer system or can be integrated within the computer system. The computer system can exchange data with the network via the connection of the network interface system. The computer system can share information and services with other connected computers. Using the network interface system, the computer system can send data to the network and receive data from the network.

In an operation that involves transferring a data packet from the host system 110 to the network, the host system 110 transmits the data packet to the packet buffer 124 via the bridge 114 and the bus interface 122. The controller 130 obtains the data packet and employs the filter 140 to examine whether the data packet meet security requirement. The filter 140 applies preset security rules to the data packet to get a control signal for indicating a disposition of the data packet. If the control signal is a drop signal, the controller 130 can inform the packet buffer 124 to drop the data packet without forwarding the data packet to the network. If the control signal is a pass signal, the data packet can be maintained in the packet buffer 124 waiting for forwarding to the network. In one embodiment, the control signal may be other dispositions besides pass and drop based on the preset security rules.

When the filter 140 is processing a security check of a data packet, the controller 130 also sends a packet header of the data packet to the regulator 150. The regulator 150 applies priority rules to the packet header and obtains a transferring priority of the data packet according to the priority rules. Then information associated with the data packet can be sequenced in a queue according to a rule with a highest priority among matched rules. If the data packet is dropped by the filter 140, the controller 130 can signal the regulator 150 to abandon the information of the data packet. If the data packet passes the security check in the filter 140, the information associated with the data packet can be stored in the queue successfully. In this situation, the network interface system 120 maintains data packets passing the security check of the filter 140 in the packet buffer 124 while the data packets have transferring priorities assigned by the regulator 150.

When the network is ready to receive the data packets, a signal is sent to the controller 130. Then the controller 130 informs the packet buffer 124 to forward the data packets to the network in sequence according to the transferring priorities indicated by the queues 154. Thus, the data packets passing the security check are transferred from the host system 110 to the network via the network interface system 120 under control of the controller 130, while the data packets that disobey the security rules are dropped by the network interface system 120 to protect the network.

In one embodiment, the data packet from the host system 110 to the network may be considered safe information. In this situation, the host system 110 can set the filter 140 to a resting operation mode in which the filter 140 does not check the data packets from the host system 110 to the network. Also, the regulator 150 can be set to a resting operation mode in which the data packets from the host system 110 may not be reordered by the regulator 150. Thus the information exchange speed between the host system 110 and the network may be faster if the network interface system 120 and/or the regulator 150 is working in the resting operation mode.

In an operation for transferring a data packet from the network to the host system 110, the data packet from the network is sent to the packet buffer 124 via the physical layer 128 and the MAC layer 126. Thereafter, the data packet can be stored in the packet buffer 124. In one embodiment, the filter 140 can check the data packet and give a disposition signal to the controller 130 according to a checking result. If the data packet does not pass the security check of the filter 140, the data packet may be abandoned. If the data packet passes the security check of the filter 140, the data packet may be reserved in the packet buffer 124. In one embodiment, the regulator 150 obtains header portion of the data packet and allocates a transferring priority to the data packet according to priority rules. In this way, a series of data packets with transferring priorities are placed into the packet buffer 124. When the host system 110 is available to receive information, the packet buffer 124 sends the data packets to the host system 110 in a sequence according to transferring priorities of the data packets.

Figure 6:
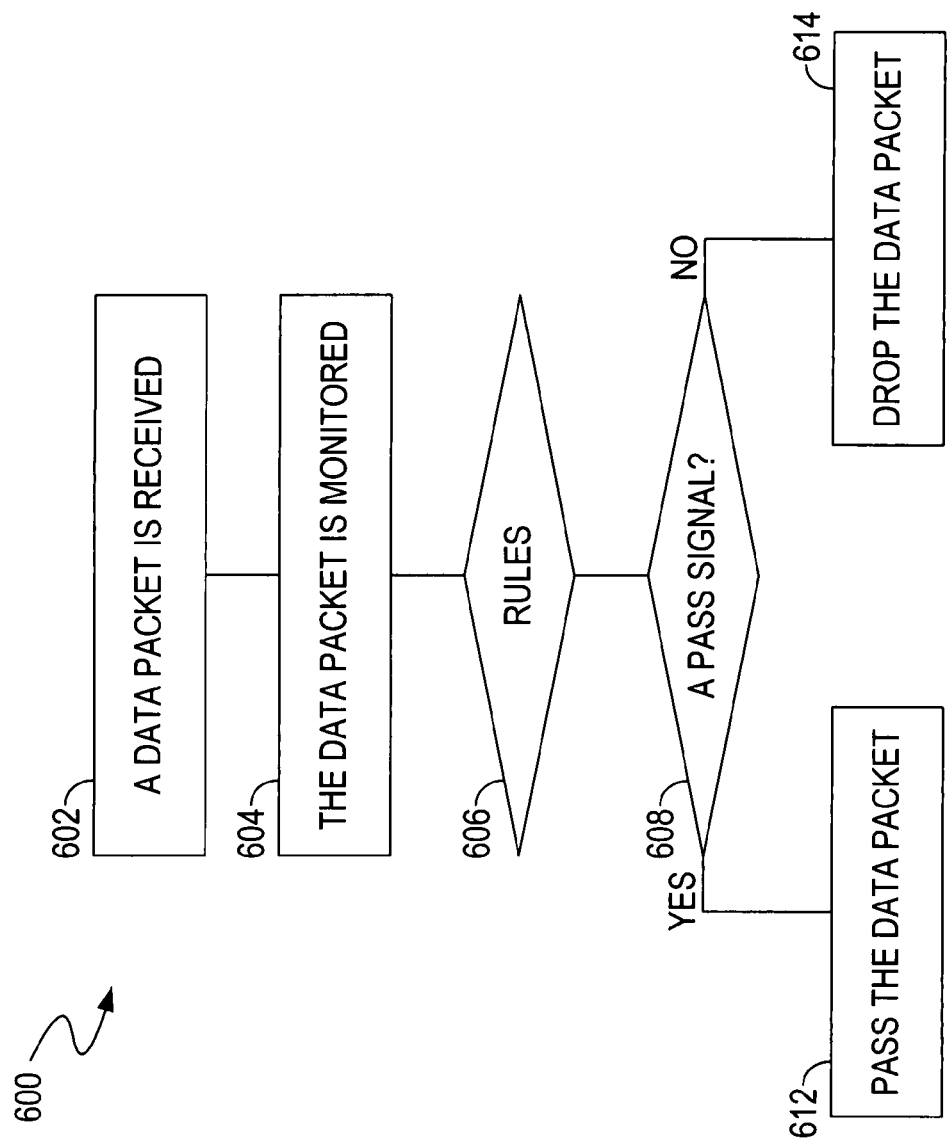
FIG. 6 is a flowchart illustrates a method of data transmission according to one embodiment of the present invention.

FIG. 6 is a flowchart 600 illustrating a method of data transmission according to one embodiment of the present invention. The flowchart 600 shows steps performed in a method for transferring a data packet between a host system and a network via a network interface system, according to one embodiment of the present invention. At step 602, a data packet is received by the network interface system (e.g., 120 in FIG. 1). At step 604, the data packet received in the step 602 is monitored. At step 606, the data packet is matched with a plurality of rules from the host system to judge whether the data packet meets security policies. At step 608, a control signal is generated based upon a matching result at the step 606. If the control signal from the step 608 is a drop signal, the data packet is dropped at a step 612. And, if the control signal of the step 608 is a pass signal, the data packet is passed at a step 614.

The embodiments that have been described herein, however, are but some of the several that utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A network interface system for transferring a data packet between a host system and a network, the network interface system comprising:
    a buffer capable of storing the data packet; and
    a controller capable of controlling a disposition of the data packet based on a plurality of matching results, the controller comprising a plurality of matchers capable of processing the data packet in parallel based on a first plurality of rules from the host system to generate the plurality of matching results, each rule of the first plurality of rules corresponding to a respective queue of a plurality of queues,
    wherein the controller allocates the data packet to a queue of the plurality of queues according to the plurality of matching results and a priority of each queue of the plurality of queues.

2. The network interface system of claim 1, wherein the controller comprises a filter for monitoring the data packet to generate a control signal, wherein the controller also controls the disposition of the data packet based on the control signal.

3. The network interface system of claim 2, wherein the filter comprises:
    a rule set for storing a second plurality of rules from the host system; and
    a match engine for matching the data packet with the second plurality of rules.

4. The network interface system of claim 2, wherein the disposition of the data packet comprises passing the data packet if the control signal is a pass signal and dropping the data packet if the control signal is a drop signal.

5. The network interface system of claim 1, wherein each rule of the first plurality of rules comprises:
    a field for indicating at least one parameter of the data packet;
    a reference content that is compared with the at least one parameter of the data packet; and
    an action for indicating the disposition of the data packet if the rule is matched by the data packet.

6. The network interface system of claim 1, wherein the plurality of matchers comprises a content matcher.

7. The network interface system of claim 1, wherein the plurality of matchers comprises a header matcher.

8. The network interface system of claim 1, wherein the disposition of the data packet comprises allocating a priority to the data packet according to the plurality of matching results and the priority of each queue of the plurality of queues.

9. The network interface system of claim 1, wherein if the data packet matches at least one rule of the first plurality of rules, then the queue to which the data packet is allocated has the highest priority among queues corresponding to the at least one rule.

10. The network interface system of claim 1, wherein if the data packet does not match any rule of the first plurality of rules, then the queue to which the data packet is allocated has the lowest priority among the plurality of queues.

11. A method for transferring a data packet between a host system and a network via a network interface system, the method comprising:
    processing the data packet by a plurality of matchers operating in parallel and based on a plurality of rules from the host system;
    generating a plurality of matching results based on the processing; and
    allocating the data packet to a queue of a plurality of queues according to the plurality of matching results and a priority of each queue of the plurality of queues,
    wherein each rule of the plurality of rules corresponds to a respective queue of the plurality of queues.

12. The method of claim 11, further comprising:
    allocating a priority to the data packet, wherein the data packet is transferred according to the priority allocated to the data packet.

13. The method of claim 11, wherein the processing the data packet comprises:
    matching the data packet with the plurality of rules by the plurality of matchers.

14. The method of claim 11, wherein the allocating the data packet to a queue of a plurality of queues comprises:
    allocating the data packet to the queue that has the highest priority among queues corresponding to at least one rule of the plurality of rules if the data packet matches the at least one rule.

15. The method of claim 11, wherein the allocating the data packet to a queue of a plurality of queues comprises:

allocating the data packet to the queue that has the lowest priority among the plurality of queues if the data packet does not match any rule of the plurality of rules.

16. A computer system comprising:

a host system for communicating with a network; and a network interface system for transferring a data packet between the host system and the network by controlling a disposition of the data packet based on a plurality of matching results, the network interface system comprising a plurality of matchers capable of processing the data packet in parallel based on a first plurality of rules from the host system to generate the plurality of matching results, each rule of the first plurality of rules corresponding to a respective queue of a plurality of queues, wherein the controller allocates the data packet to a queue of the plurality of queues according to the plurality of matching results and a priority of each queue of the plurality of queues.

17. The computer system of claim 16, wherein the network interface system comprises a filter for monitoring the data packet to control the disposition of the data packet.

18. The computer system of claim 17, wherein the filter comprises:

a rule set for storing a second plurality of rules from the computer system; and a match engine for matching the data packet with the second plurality of rules.

19. The computer system of claim 16, wherein the plurality of matchers comprises a content matcher.

20. The computer system of claim 16, wherein the plurality of matchers comprises a header matcher.

21. The computer system of claim 16, wherein if the data packet matches at least one rule of the first plurality of rules, then the queue to which the data packet is allocated has the highest priority among queues corresponding to the at least one rule.

22. The computer system of claim 16, wherein if the data packet does not match any rule of the first plurality of rules, then the queue to which the data packet is allocated has the lowest priority among the plurality of queues.

* * * * *